United States Patent [19]
Lin et al.

[11] Patent Number: 5,740,334
[45] Date of Patent: Apr. 14, 1998

[54] QUANTIZATION METHOD FOR COLOR DOCUMENT REPRODUCTION IN A COLOR PRINTING SYSTEM

[75] Inventors: Ying-wei Lin, Penfield; Katherine Loj, Rochester, both of N.Y.

[73] Assignee: Xerox Corporation, Stamford, Conn.

[21] Appl. No.: 674,178

[22] Filed: Jul. 1, 1996

[51] Int. Cl.$^6$ ................................................. H04N 1/52
[52] U.S. Cl. ................................................. 395/109; 358/534
[58] Field of Search ........................... 395/109; 358/534, 358/535, 536, 456, 457, 458, 460, 298; 382/237, 270, 162

[56] References Cited

U.S. PATENT DOCUMENTS

| | | |
|---|---|---|
| 4,149,194 | 4/1979 | Holladay . |
| 4,485,397 | 11/1984 | Scheuter et al. . |
| 4,578,714 | 3/1986 | Sugiura et al. ......................... 358/457 |
| 4,876,611 | 10/1989 | Fischer et al. ......................... 358/456 |
| 5,014,123 | 5/1991 | Imoto . |
| 5,045,952 | 9/1991 | Eschbach . |
| 5,223,953 | 6/1993 | Williams ................................. 358/456 |
| 5,225,915 | 7/1993 | Ciccone et al. . |
| 5,226,094 | 7/1993 | Eschbach . |
| 5,278,670 | 1/1994 | Eschbach . |
| 5,394,252 | 2/1995 | Holladay et al. ......................... 358/533 |

OTHER PUBLICATIONS

Reiner Eschbach; *Pulse–Density Modulation on Rastered Media: Combining Pulse–Density Modulation and Error Diffusion*; Accepted Dec. 7, 1989; pp. 707–716.

R. Eschbach and R. Hauck; *Binarization Using a Two–Dimensional Pulse–Density Modulation*; Apr. 23, 1987; pp. 1873–1878.

Manfred R. Schroeder; *Images from Computers*; IEEE Spectrum Mar. 1969; pp. 66–78.

Optics Communications; Dec. 1, 1984; vol. 52, No. 3; pp. 165–168.

C. Billotet–Hoffmann and O. Bryngdahl; *On The Error Diffusion Technique For Electronic Halftoning*; Proceedings of the SID; vol. 24/3, 1983; pp. 253–258.

Robert W. Floyd and Louis Steinberg; *An Adaptive Algorithm for Spatial Greyscale*.

J. A. C. Yule; *Principles of Color Reproduction*; Kodak Research Laboratories; pp. 332–333.

Xerox Disclosure Journal; *A Partial Dot Algorithm for Multi–Level Pixel Halftone Cells*; Thomas Henderson et al.; vol. 14 No. 4 Jul./Aug. 1989.

*Primary Examiner*—Scott A. Rogers
*Attorney, Agent, or Firm*—Duane C. Basch

[57] ABSTRACT

The present invention is a method and apparatus for reducing two-color moiré often found during the rendering of full color images using halftoning techniques. The invention relies upon the application of a non-periodic halftone operation to the least perceptible color separation (e.g., yellow) so as to prevent the formation of periodic structures due to the interaction of the yellow colorant with one of the other colorants (e.g., cyan or magenta).

18 Claims, 6 Drawing Sheets

QUANTIZATION METHOD FOR COLOR DOCUMENT REPRODUCTION IN A COLOR PRINTING SYSTEM

This invention relates generally to halftoning for reproduction of color documents, and more particularly to the application of both periodic and non-periodic screens to prevent the formation of two-color moiré in a document rendered with at least two colors, each of the colors having a distinct level of visual perception.

BACKGROUND AND SUMMARY OF THE INVENTION

The present invention is a method and apparatus for halftoning the color separations of a digital color document so as to significantly reduce printing artifacts that result from the interactions of two of the printing colors—referred to as moiré.

Full color in printed documents is the result of rendering, in combination, a limited set of marking colors over a small area, in densities selected to integrate to a desired color response. This rendering is accomplished in many printing devices by reproducing separations of the image, where each separation provides a single primary color of varying density. When combined together with other color separations, the result is a full color image.

In the digital reproduction of documents, a color separation is conveniently represented as a monochromatic bitmap, which may be described as an electronic image with discrete image signals (hereinafter, pixels) defined by position and density. The density of a color at any particular pixel position is represented as one of a number of possible states or levels. When more than two levels of density are used in the description of the image, the levels are often termed "gray", indicating that they vary between a maximum level and minimum level, and without reference to their actual color. Most printing systems have the ability to output or render an image with a small number of levels, typically two, although more output levels are possible. Common input devices including document scanners, digital cameras and computer image generators, however, are capable of describing an image with a substantially larger number of gray levels (e.g., 256 levels is common), although larger and smaller numbers of levels are also possible. An image initially described with a large set of levels typically must be describable using a smaller set of levels, in a manner that captures the intent of the user, in order to allow rendering of the image as a hardcopy output. In digital printing of color documents this is accomplished by reducing the relatively large number of input levels in a color separation to a smaller number of output levels. The multiple color separations are then combined together at printing, for example in an image-on-image printing system, to yield the final color print. Commonly, color documents are formed using cyan, magenta, yellow and black colorants although alternative or other combinations of colorants may also be used.

For purposes of simplicity the following discussion will consider the case where the number of output levels (n) is two (i.e., a binary printer). As noted above, however, n may be greater than two for a gray level printing process as described, for example, by Lin et al. in application Ser. No. 08/569,036 for a METHOD AND APPARATUS FOR GRAY SCREENING, and by T. Henderson et al. in the Xerox Disclosure Journal, Vol. 14, No 4, pp. 175–76, both of which are hereby incorporated by reference with respect to teachings regarding gray screening.

In printing color documents, obtaining the desired density of a particular color is accomplished by halftoning, where separation density variation is represented by marking greater or fewer numbers of ON pixels (binary) in a distinct area of a separation. In a halftoning method known as dithering or screening a value representing the density of each color separation pixel of an array of separation pixels within the area is compared to one of a set of preselected thresholds (i.e., stored as a dither matrix) and the repetitive output pattern generated by this comparison is considered a halftone cell as taught, for example, in U.S. Pat. No. 4,149,194 to Holladay. The effect of such an arrangement is that for an area where the image density of the color separation lies between the maximum and minimum levels, some of the thresholds within the dither matrix will be exceeded while others will not. In the binary case, the separation pixels or cell elements for which the thresholds are exceeded might be printed as a maximum colorant value, while the remaining separation pixels are allowed to remain white, dependent on the actual physical quantity described by the data.

While widely accepted as a method for rendering color prints of digital images, dithering creates problems where the repeating pattern of the screen, when superposed over similar repeating patterns in the multiple color separations, can cause moiré or other artifacts.

Holladay et al., U.S. Pat. No. 5,394,252, teaches that there are always 2-way moiré patterns between the color separations, but that the angles are often chosen to maximize the frequency of the moirés, resulting in the "rosettes" noted in magnified color halftones. This is true of both analog (photographic) and digital systems. However, Holladay et al. ('252) is directed to the interaction of the three most perceptible colors, cyan, magenta and black, and to the elimination of three-color moiré amongst such colors using a non-periodic screen. Holladay et al. further notes that error diffusion, because it operates on a pixel-by-pixel basis is non-periodic, mitigating the problems of moiré.

The present invention is directed to reducing two-color moiré, particularly in yellow-cyan and yellow-magenta regions, where the two screens are separated by an angle of approximately 15° (degrees). The present invention further builds on the recognition that the yellow colorant is typically the least perceptible of the primary marking colors. When rotated dot halftone screens are employed to render the three or four (black) color separations, the interaction between two of the color separations can cause periodic artifacts, particularly when the angle between the rotated screens is shallow, such as about 15°. This periodic artifact, referred to as two-color moiré, can be caused by (a) significant overlap of the absorption spectra of the two colors or (b) a physical interaction between the dots of the two colors, resulting in a breaking-up of the magenta or cyan halftone dots when placed or positioned over or on top of a yellow halftone dot. This two-color moiré problem is preferably eliminated by a system that will be described with respect to the present invention.

Heretofore, a number of patents and publications have disclosed, the relevant portions of which are hereby incorporated by reference and which may be briefly summarized as follows:

U.S. Pat. No. 4,194,194 to Holladay, assigned to the assignee of the present invention, discloses that the angle of the halftone screen can be changed to generate screen patterns which do not strongly beat visually against each other, thereby reducing the objectionable moiré. Noted as particularly critical are the angles between the most prominent colors, cyan, magenta and black. A typical arrangement of rotated screen angles is 90° (or 0°), 15°, 45°, and 75° for yellow, cyan, black and magenta, respectively.

U.S. Pat. No. 5,223,953 to Williams teaches an alternative implementation of the teachings of Holladay '194.

U.S. Pat. No. 5,225,915 to Ciccone et al. discloses that the addition of noise or enhancement of inherent noise can mask moiré. However, such schemes inherently alter the accuracy of the image.

Other methods exist that generate non-periodic or quasi non-periodic structure. Examples for such methods are error diffusion and similar halftoning processes, stochastic screening and pulse density modulation. Error diffusion, is taught, in "An Adaptive Algorithm for Spatial Greyscale" by Floyd and Steinberg, Proceedings of the SID 17/2, 75–77 (1976). Another, more elaborate method would be the error diffusion techniques of U.S. Pat. No. 5,045,952 to Eschbach, which serves to provide image dependent edge enhancement, assigned to the same assignee as the present invention.

In accordance with the present invention, there is provided an apparatus for creating multiple color images, including: an image-on-image printing system capable of rendering each of the multiple colors with n output density levels in superposed positions on a substrate to produce selected colors; a source of image signals describing a multiple color document with a plurality of color separations, each image signal representing optical density with one of m levels, where m is greater than n; a processor for preparing color documents for printing, said color documents each including a plurality of color separations, each color separation represented as a set of image signals describing optical density using m density levels; a non-periodic halftone processor connected to said source of image signals, said non-periodic halftone processor reducing the number of levels m representing optical density in a first color separation to a number of levels $n_n$ representing optical density, said halftone processor generating a non-periodic pattern thereby; a periodic halftone processor connected to said source of image signals, said periodic halftone processor reducing the number of levels m representing optical density in at least one additional separation to a number of levels $n_p$ representing optical density, said periodic halftone processor generating a periodic pattern thereby; and means for directing signals processed at the non-periodic halftone processor and the halftone processor to said printer to print said processed color image.

In accordance with another aspect of the present invention, there is provided a method for creating multiple color images on a printing system capable of rendering each of the multiple colors with n output density levels in superposed positions on a substrate to produce selected colors, including: receiving, from a source of image signals, image signals describing a multiple color document with a plurality of color separations, each image signal representing an optical density of a particular color with one of m levels, where m is greater than n; processing the image signals of a first color separation with a non-periodic halftone processor connected to said source of image signals, to reduce the number of levels m representing optical density in the first color separation to a number of levels $n_n$ representing the optical density, and generating a non-periodic output pattern thereby; processing the image signals of at least one additional color separation with a periodic halftone processor connected to said source of image signals, to reduce the number of levels m representing optical density in the at least one additional separation to a number of levels $n_p$ representing the optical density, and generating periodic patterns for the at least one additional color separation thereby; and directing signals processed at the non-periodic halftone processor and the periodic halftone processor to said printer to print the processed color image.

In accordance with yet another aspect of the present invention, there is provided an image-on-image printing system for creating multiple color images, including: an image input terminal acting as a source of digitized image signals, the digitized image signals describing a multiple color document with a plurality of color separations, each digitized image signal representing the optical density of a pixel for each of a plurality of colors; an image processing unit for preparing the digitized image signals for printing as a color document wherein the color document is render using a plurality of color separations in superposed registration and where each color separation is represented as a set of image signals describing optical of the pixels, said image processing unit further including a non-periodic halftone processor, said non-periodic halftone processor reducing the number of levels representing optical density in a first color separation to nn levels, said halftone processor generating a non-periodic pattern thereby, and a periodic halftone processor, said periodic halftone processor reducing the number of levels representing optical density in two additional color separations to np levels, said periodic halftone processor generating a periodic pattern thereby; and means for directing signals processed at the non-periodic halftone processor and the periodic halftone processor to said printer to print said processed color image.

One aspect of the invention deals with a basic problem in full color image rendering—the interaction of two of the primary colors when rendered using periodic structures. In particular, the present invention is directed to the improvement of color image print quality through the reduction of two-color moiré.

This aspect is further based on the discovery of a technique that alleviates this problem. The technique employs error diffusion or a stochastic screening process for the rendition of the least perceptible (e.g., yellow) color separation.

The technique described above is advantageous because it is simple compared to other approaches. In addition, it can be used to expand process latitude for printing systems employing image-on-image marking technology. The techniques of the invention are advantageous because they permit the efficient processing of color separations using one of a number of possible quantization techniques. As a result of the invention, color printing systems will produce higher quality images by minimizing the perception of artifacts resulting from structural interactions between two color separations, one of which is a least perceptible color separation such as yellow.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

An "image" is a pattern of physical light. To "render" or "print" a color image is to mark a substrate with at least two and preferably three or more colorants (e.g., inks, toners, pigments, etc.) so as to form a full color image from the visual integration of the colorants. As used herein, the primary marking colors are understood to include cyan, magenta, yellow and possibly black. However, it is well understood that the pigments or colorants employed to produce the full color image on a substrate may vary. Accordingly, the term "least perceptible colorant" will be employed herein to represent the single colorant of the plurality of colorants that is least visually perceptible by an observer. Typically, the least perceptible colorant will be yellow, however, there is no intention to limit the application of aspects of the present invention to only yellow colorants.

A "pixel" is the smallest segment into which an image is divided in a given system. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An "image input device" or "image input terminal" (IIT) is a device that can receive an image and provide an item of data defining a version of the image. A "scanner" is an image input device that receives an image by a scanning operation, such as by scanning a document.

An "image output device" or "image output terminal" (IOT) is a device that can receive an item of data defining an image and provide the image as output. A "display" is an image output device that provides the output image in human viewable form. The visible pattern presented by a display is a "displayed image" or simply "image."

Figure 1:
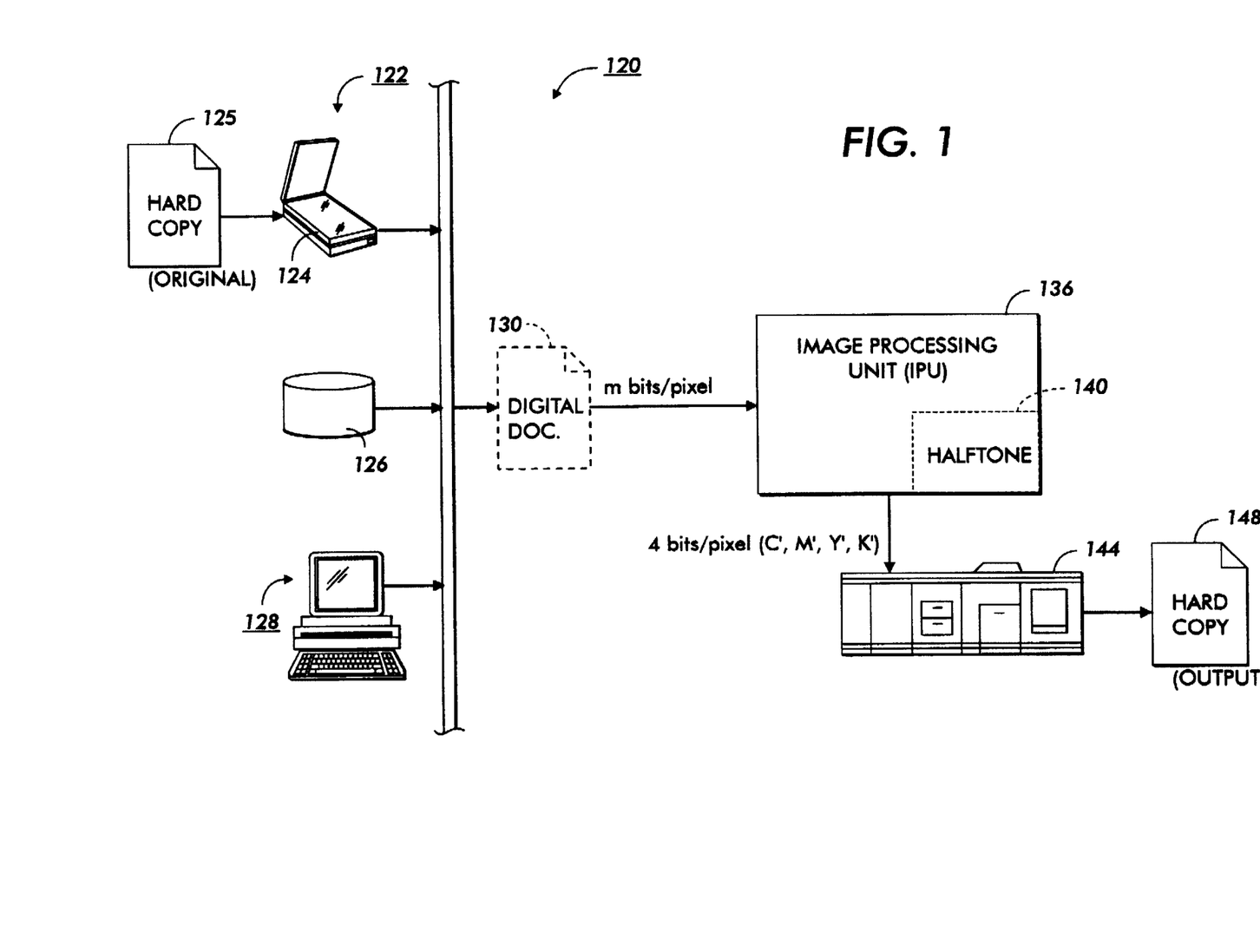
FIG. 1 is a data flow diagram depicting the flow of data in an image processing system and an associated digital printing system in which the present invention may find particular use.

Referring to FIG. 1, depicted therein is a data flow diagram for a reprographic or printing system 120. System 120 preferably receives a digital document image 130 generated from one of a plurality of image input terminals 122, including but not limited to an scanner 124 for digitizing hardcopy original document 125, a storage device 126 or a computer workstation 128. Once represented in a digitized format, preferably a multilevel signal (m) for each of three colors (e.g., 24-bit (8 bits/separation)), the data is passed or otherwise transferred to an image processing means 136. Image processing means 136 comprises, a processor dedicated to performing various programmable operations on the image signals supplied thereto or application specific integrated circuitry adapted to provide various image processing features as described for example by David J. Metcalfe et al. in application Ser. No. 08/285,326, filed Aug. 3, 1994, the relevant portions of which are hereby incorporated by reference for its teachings.

Included in image processing means 136 is a halftoning circuit 140 that operates on m-level input signals to produce an n-level output signal for each color separation, where n is less than m, and where n is typically one bit per pixel per color. Further details of the operation of halftoning circuit 140 are described with respect to FIG. 2 below. The halftoned image signals (C', M', Y', and K') are then passed to an image output terminal 144 represented in FIG. 1 as an image-on-image (I-0-I) system. Once received by the image output terminal, the halftoned image data is employed to control the placement of colorants on a substrate passing therethrough to render hard copy output 148.

Figure 11:
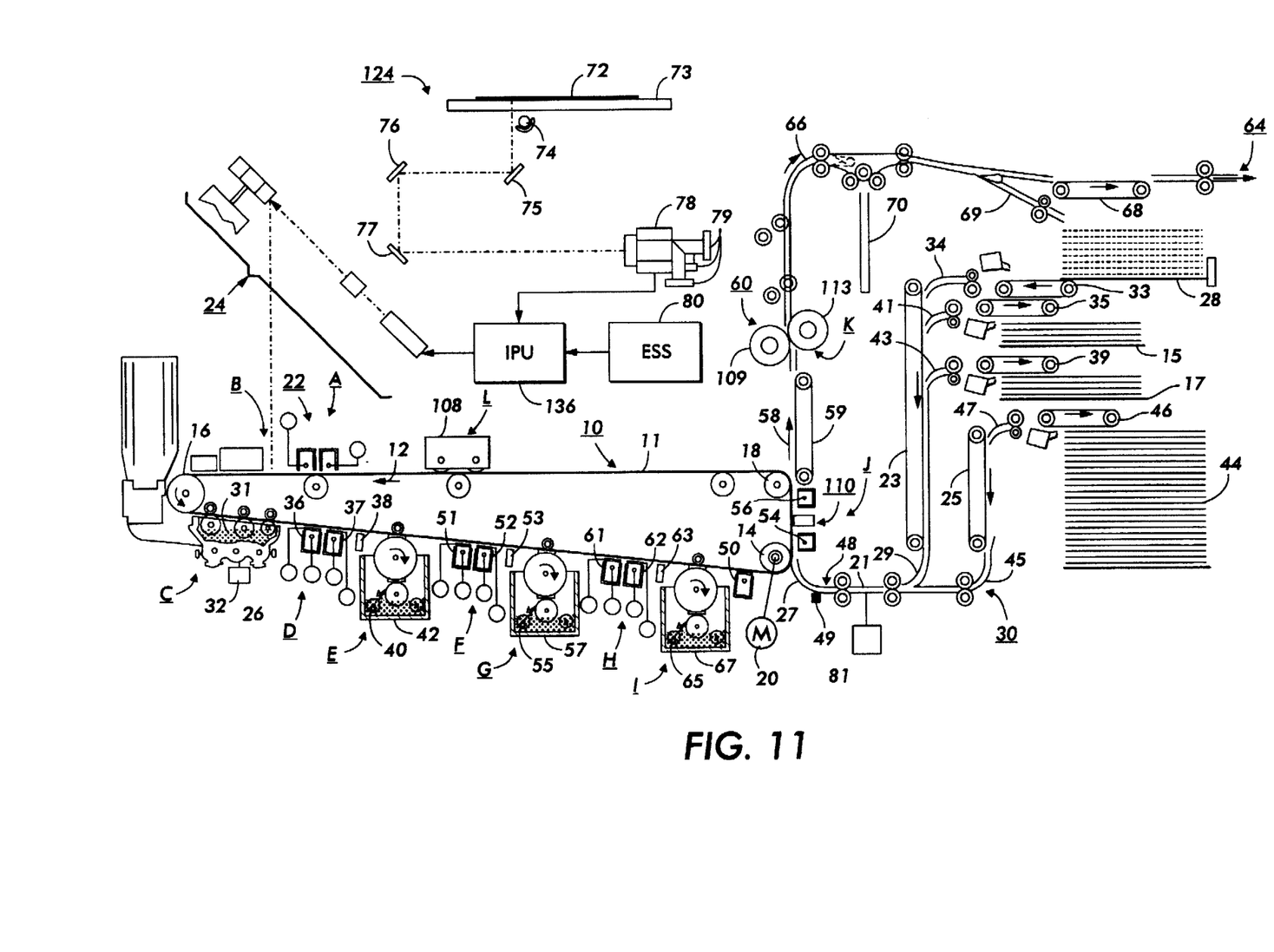
FIG. 11 is an illustration of an image-on-image printing system in which the color separations produced in accordance with the present invention are preferably rendered.

Turning next to FIG. 11, depicted therein is an exemplary image-on-image printing system. As described with respect to FIG. 1, the color copy process typically involves a computer generated color image which may be conveyed to an image processor 136, or alternatively a color document 72 may be placed on the surface of a transparent platen 73. A scanning assembly 124, having a light source 74 illuminates the color document 72. The light reflected from document 72 is reflected by mirrors 75, 76, and 77, through lenses (not shown) and a dichroic prism 78 to three charged-coupled linear photosensing devices (CCDs) 79 where the information is read. Each CCD 79 outputs a digital image signal the level of which is proportional to the intensity of the incident light. The digital signals represent each pixel and are indicative of blue, green, and red densities. They are conveyed to the IPU 136 where they are converted into color separations and bit maps, typically representing yellow, cyan, magenta, and black. IPU 136 stores the bit maps for further instructions from an electronic subsystem (ESS) 80. The ESS is preferably a self-contained, dedicated mini-computer having a central processor unit (CPU), electronic storage, and a display or user interface (UI). The ESS is the control system which prepares and manages the image data flow between IPU 136 and image input terminal 122, 124, as well as being the main multi-tasking processor for operating all of the other machine subsystems and printing operations to be described hereinafter. The printing operations include imaging, developing, sheet delivery and transfer, and various functions associated with subsequent finishing processes. Some or all of these subsystems may have microcontrollers that communicate with the ESS 80.

The printing machine employs a photoreceptor 10 in the form of a belt having a photoconductive surface layer 11 on an electroconductive substrate 13. Preferably the surface 11 is made from an organic photoconductive material, although numerous photoconductive surfaces and conductive substrates may be employed. The belt 10 is driven by means of motor 20 having an encoder attached thereto (not shown) to generate a machine timing clock. Photoreceptor 10 moves along a path defined by rollers 14, 18, and 16 in a counter-clockwise direction as shown by arrow 12.

Initially, a photoreceptor 10 passes through charging station A where a corona generating device, indicated generally by the reference numeral 22, charges photoreceptor 10 to a relatively high, substantially uniform potential. Next, the charged portion of photoreceptor 10 is advanced through an imaging station B. At imaging station B, the uniformly charged belt 10 is exposed to the scanning device 24 which causes the photoreceptor to be discharged in accordance with the output from the scanning device. The scanning device is a laser Raster Output Scanner (ROS). The ROS creates the image in a series of parallel scan lines having a certain resolution, generally referred to as lines per inch. Scanning device 24 may include a laser with rotating polygon mirror blocks and a suitable modulator, or in lieu thereof, a light emitting diode array (LED) write bar positioned adjacent the photoreceptor 10.

At a first development station C, a magnetic brush developer unit, indicated generally by the reference numeral 26 advances developer material 31 into contact with the latent image and latent target marks. Developer unit 26 has a plurality of magnetic brush roller members. These magnetic brush rollers transport negatively charged black toner material to the latent image for development thereof. Power supply 32 electrically biases developer unit 26.

At recharging station D, a pair of corona recharge devices 36 and 37 are employed for adjusting the voltage level of both the toned and untoned areas on photoreceptor 10 to a substantially uniform level. A power supply is coupled to each of the electrodes of corona recharge devices 36 and 37. Recharging devices 36 and 37 substantially eliminate any voltage difference between toned areas and bare untoned areas, as well as to reduce the level of residual charge remaining on the previously toned areas, so that subsequent development of different color toner images is effected across a uniform development field.

Imaging devices 38, 53, and 63 are used to superimpose subsequent images by selectively discharging the recharged photoreceptor. These imaging devices may include, for example, a LED image array bar, or another ROS. On skilled in the art will appreciate that the operation of imaging devices 38, 53, and 63 are also controlled by ESS 80. Moreover, one skilled in the art will recognize that those areas developed with black toner will not be subjected to sufficient light from the imaging devices to discharge the photoreceptor region lying below the black toner particles. However, this is of no concern as there is little likelihood of a need to deposit other colors over the black regions.

Imaging device 38 records a second electrostatic latent image on photoreceptor 10. A negatively charged developer material 40, for example, one including yellow toner, develops the second latent image. The toner is contained in a developer unit 42 disposed at a second developer station E and is transported to the second latent image recorded on the photoreceptor by a donor roll. A power supply (not shown) electrically biases the developer unit to develop this latent image with the negatively charged yellow toner particles 40. As will be further appreciated by those skilled in the art, the yellow colorant is deposited immediately subsequent to the black so that further colors that are additive to yellow, and interact therewith to produce the available color gamut, can be exposed through the yellow toner layer.

At a second recharging station F, a pair of corona recharge devices 51 and 52 are employed for adjusting the voltage level of both the toned and untoned areas on photoreceptor 10 to a substantially uniform level. A power supply is coupled to each of the electrodes of corona recharge devices 51 and 52. The recharging devices 51 and 52 substantially eliminate any voltage difference between toned areas and bare untoned areas, as well as to reduce the level of residual charge remaining on the previously toned areas so that subsequent development of different color toner images is effected across a uniform development field. A third latent image is then recorded on photoreceptor 10 by imaging device 53. This image is developed using a third color toner 55 contained in a developer unit 57 disposed at a third developer station G. An example of a suitable third color toner is magenta. Suitable electrical biasing of the developer unit 57 is provided by a power supply, not shown.

At a third recharging station H, a pair of corona recharge devices 61 and 62 adjust the voltage level of both the toned and untoned areas on photoreceptor 10 to a substantially uniform level. A power supply is coupled to each of the electrodes of corona recharge devices 61 and 62. The recharging devices 61 and 62 substantially eliminate any voltage difference between toned areas and bare untoned areas as well as to reduce the level of residual charge remaining on the previously toned areas, so that subsequent development of different color toner images is effected across a uniform development field. A fourth latent image is created using imaging device 63. The fourth latent image is formed on both bare areas and previously toned areas of photoreceptor 10 that are to be developed with the fourth color image. This image is developed, for example, using a cyan color toner 65 contained in developer unit 67 at a fourth developer station I. Suitable electrical biasing of the developer unit 67 is provided by a power supply, not shown.

Developer units 42, 57, and 67 are preferably of the type known in the art which do not interact, or are only marginally interactive with previously developed images. For examples, a DC jumping development system, a powder cloud development system, or a sparse, non-contacting magnetic brush development system are each suitable for use in an image on image color development system as described herein.

In order to condition the toner for effective transfer to a substrate, a negative pre-transfer corotron member 50 negatively charges all toner particles to the required negative polarity to ensure proper subsequent transfer.

During the exposure and development of the color image on the photoconductor, a sheet of support material is advanced to transfer station J by a sheet feeding apparatus 30. During simplex operation (single sided copy), a blank sheet may be fed from tray 15 or tray 17, or a high capacity tray 44 thereunder, to a registration transport 21, in communication with controller 81, where the sheet is registered in the process and lateral directions, and for skew position. One skilled in the art will realize that trays 15, 17, and 44 each hold a different sheet type. The speed of the sheet is adjusted at registration transport 21 so that the sheet arrives at transfer station J in synchronization with the image on the surface of photoconductive belt 10. Registration transport 21 receives a sheet from either a vertical transport 23 or a high capacity tray transport 25 and moves the received sheet to a pretransfer baffle 27. The vertical transport 23 receives the sheet from either tray 15 or tray 17, or the single-sided copy from duplex tray 28, and guides it to the registration transport 21 via a turn baffle 29. Sheet feeders 35 and 39 respectively advance a copy sheet from trays 15 and 17 to the vertical transport 23 by chutes 41 and 43. The high capacity tray transport 25 receives the sheet from tray 44 and guides it to the registration transport 21 via a lower baffle 45. A sheet feeder 46 advances copy sheets from tray 44 to transport 25 by a chute 47.

The pretransfer baffle 27 guides the sheet from the registration transport 21 to transfer station J. Charge limiter 49 located on pretransfer baffle 27 restricts the amount of electrostatic charge a sheet can place on the baffle 27 thereby reducing image quality problems and shock hazards. The charge can be placed on the baffle from either the movement of the sheet through the baffle or by the corona generating devices located at transfer station J. When the charge exceeds a threshold limit, charge limiter 49 discharges the excess to ground.

Transfer station J includes a transfer corona device 54 which provides positive ions to the backside of the copy sheet. This attracts the negatively charged toner powder images from photoreceptor belt 10 to the sheet. A detack corona device 56 is provided for facilitating stripping of the sheet from belt 10.

A sheet-to-image registration detector 110 is located in the gap between the transfer and corona devices 54 and 56 to sense variations in actual sheet to image registration and provides signals indicative thereof to ESS 80 and controller 81 while the sheet is still tacked to photoreceptor belt 10. After transfer, the sheet continues to move, in the direction of arrow 58, onto a conveyor 59 that advances the sheet to fusing station K.

Fusing station K includes a fuser assembly, indicated generally by the reference numeral 60, which permanently fixes the transferred color image to the copy sheet. Preferably, fuser assembly 60 comprises a heated fuser roller 109 and a backup or pressure roller 113. The copy sheet passes between fuser roller 109 and backup roller 113 with the toner powder image contacting fuser roller 109. In this manner, the multi-color toner powder image is permanently fixed to the sheet. After fusing, chute 66 guides the advancing sheet to feeder 68 for exit to a finishing module (not shown) via output 64. However, for duplex operation, the sheet is reversed in position at inverter 70 and transported to duplex tray 28 via chute 69. Duplex tray 28 temporarily collects the sheet whereby sheet feeder 33 then advances it to the vertical transport 23 via chute 34. The sheet fed from duplex tray 28 receives an image on the second side thereof, at transfer station J, in the same manner as the image was deposited on the first side thereof. The completed duplex copy exits to the finishing module (not shown) via output 64.

After the sheet of support material is separated from photoreceptor 10, the residual toner carried on the photoreceptor surface is removed therefrom. The toner is removed at cleaning station L using a cleaning brush structure contained in a housing 108.

Figure 2:
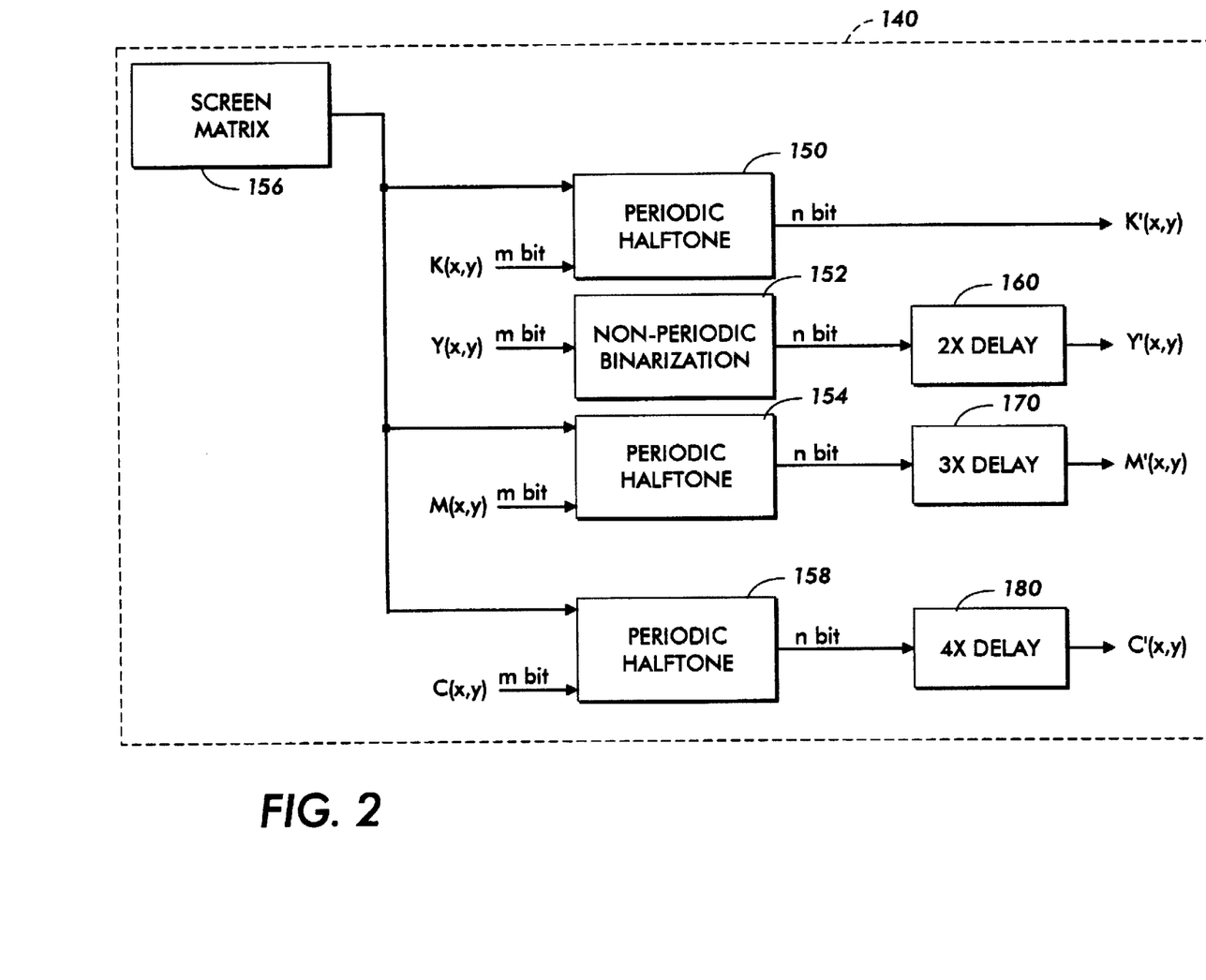
FIG. 2 is a schematic illustration of the components of a halftoning circuit in which the present invention may be implemented.

Having described the operation of the image-on-image printing system, attention is now turned to the operation of the halftoning circuit 140 in accordance with aspects of the present invention. Referring to FIG. 2, halftoning circuit 140 is schematically illustrated. In a preferred embodiment, the halftoning circuit produces a rotated dot halftone screen based upon the halftone screen stored as indicated by screen matrix 156, the rotated dot screen being applied to the most visually perceptible colorants (e.g., black, cyan and magenta), while a non-periodic halftone operation is applied to the yellow color separation. In particular, the screen matrix supplies a rotated dot data to periodic halftoning block 150. At block 150, the various thresholds associated with, for example, a 45° screen are applied or compared against the incoming color separation data (K) and the output is an n-bit value indicating whether the color data was above or below the threshold for the halftone cell location. While n may represent a multi-bit output, it will be represented herein as a binary value, indicating whether a black output pixel will be exposed or left unexposed at a corresponding location on the output image. A method for the efficient production of variable angle screen cells by a screen matrix, and a corresponding representation scheme, is provided in U.S. Pat. No. 4,149,194 to Holladay, the relevant portions of which are hereby incorporated by reference. Similarly, the output image data is generated for the magenta and cyan output images at blocks 154 and 158, respectively employing 75° and 15° screen rotation angles.

Also shown in FIG. 2 is the non-periodic processing of the yellow or least perceptible color separation data. As represented by non-periodic halftone processing block 152, the yellow separation data is processed using either error diffusion or random screen techniques so as to reduce any periodic structure in the yellow image upon output. The error diffusion is accomplished, for example, by the process taught by Metcalfe et al. or by J. Shiau in application Ser. No. 08/167,758, filed Dec. 15, 1993, both of which are hereby incorporated by reference for their teachings.

Again, although the present embodiment is described with respect to a binary output image, it is possible for both the number of output levels n for the halftoned color separations to be greater than 2, and for the error diffused separation to be greater than 2 as well. Moreover, the present invention contemplates further that the number of possible output levels for the non-period output ($n_n$) to be different than the number of output levels for the periodic output ($n_p$). As an example, consider a partial pixel exposure possibility for a high addressability printing system. In error diffusion, a requirement may be imposed on the high addressability system to only output full pixels, as opposed to partial pixel exposure, while for the periodic or screened output a 4x addressability may be employed (e.g., each pixel has four subpixels that may be controlled independently). This aspect is important because error diffusion generates isolated dots; if the dots are too small they will not be "stable" when output by a xerographic printing system and process variation will result in color shifts. Using only full dots for the error diffused pixels improves stability over the 4x sub-pixels. Moreover, because the yellow or least visually perceptible color is imaged using the non-periodic imaging technique, any worms or noise resulting from the non-periodic technique is not visible. For added stability, it is also possible to require the error diffused or non-periodic output to be done in two or more pixel clusters as a minimum non-periodic "dot" size.

While the use of error diffusion is often believed to be the source of noise in an output image, the use of error diffusion for the yellow color separation results in noise that is significantly less noticeable and therefore of less concern. Accordingly, a simple error diffusion technique, such as that proposed by Floyd & Steinberg, may be employed. Alternatively, the non-periodic processing block can employ circuitry capable of applying a random, or at least very large period, screen to the color separation data. Here again it should be appreciated that because the visual perception of the yellow colorant is relatively small simple random screening processes may be employed. Having processed each of the associated pixels for the four color separations, the resulting data is then delayed by delay blocks 160, 170, or 180 so as to maintain the registration of the image pixels when exposed or otherwise rendered on the image output terminal.

Turning now to FIGS. 3–10, the advantages of the present invention are further illustrated. In FIGS. 3–10, black printing on a white background has been employed to represent either a single color separation or the combination of two color separations. It will be appreciated by those skilled in the art that the resultant black and white rendition of the two-color images is not as visually pleasing or artifact free as an actual two-color print would be, however the figures are believed to be illustrative of the advantages of the present invention nonetheless. In particular, FIGS. 3, 4 and 5 respectively represent cyan, magenta and yellow color separations processed using 15, 75 and 90 degree rotated dot halftoning operations. It will also be appreciated that the figures provide merely one example of screen angle combinations and that other screen angle combinations (e.g., different colors at the same angles, or separation angles rotated by an equivalent amount) give rise to similar effects and are, therefore, capable of correction by the present invention.

Figure 3:
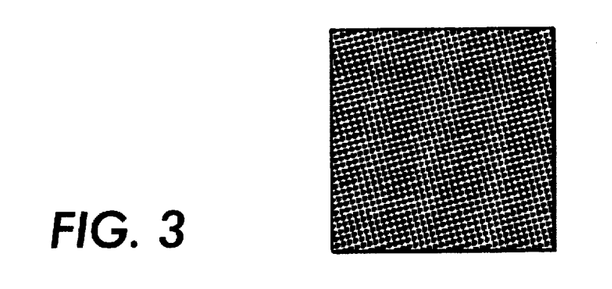
FIGS. 3–10 are examples of color separations for the same portion of a color image, illustrating the improved performance of the present invention.
Figure 4:
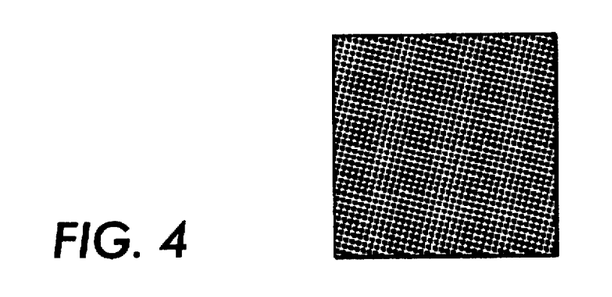
Figure 5:
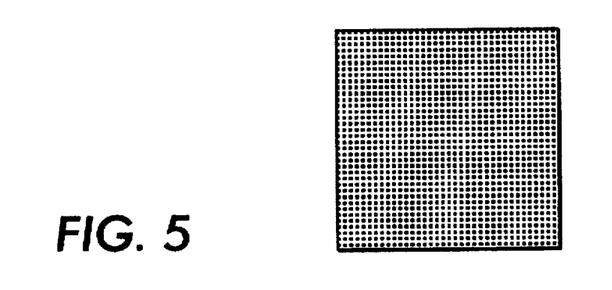
Figure 6:
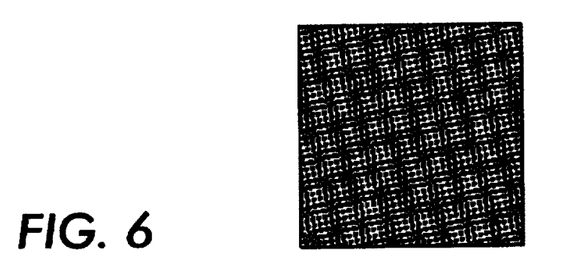
Figure 7:
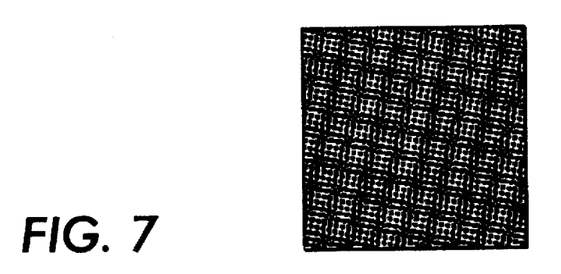

The effects of moiré arising from combining the individual separations of FIGS. 3, 4 and 5 are further illustrated in FIGS. 6 and 7. In particular, FIG. 6 illustrates the beating that arises between the cyan and yellow separations when there is only an approximately 15° angle between the screen angles used to produce the separations. Similarly, FIG. 7 illustrates the two-color moiré that arises between the yellow and magenta color separations when processed in accordance with typical halftone operations.

Figure 8:
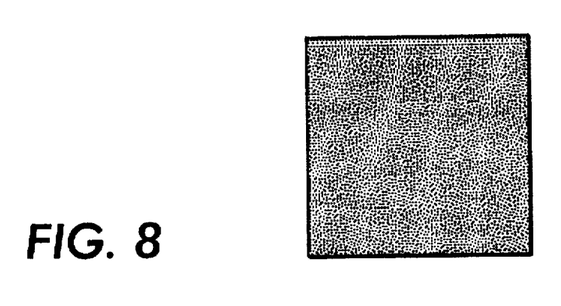
Figure 9:
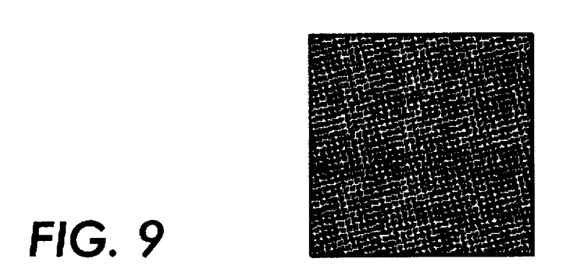
Figure 10:
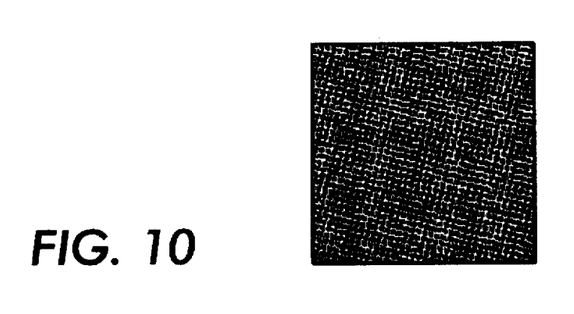

FIG. 8 illustrates the yellow color separation when processed in accordance with the present invention. In particular, the yellow separation was processed using a simple error diffusion technique as described with respect to non-periodic halftone block 152 in FIG. 2. For purposes of comparison, the yellow color separation of FIG. 8 can be combined with the cyan and magenta separations of FIGS. 3 and 4 to illustrate the improved rendition, and elimination of artifacts, in the two-color combinations. Specifically, FIG. 9 represents the two-color separations of cyan and yellow, where yellow is the least perceptible colorant and is processed using a non-periodic rendering technique. Similarly, FIG. 10 represents the two-color combination of magenta and yellow, again having the yellow separation processed using the error diffusion technique previously described. As the result of a comparison of FIG. 6 with FIG. 9 or FIG. 7 with FIG. 10, it will be appreciated by even the casual observer that FIGS. 9 and 10 lack the structural interaction (moiré) found in the other figures. Accordingly, the processing of the least visually perceptible color separation reduces the likelihood of two-color moiré. Furthermore, the use of such a process expands the latitude of the printing system. To print the halftone dot of one color, say cyan, over the dots of the yellow color separation requires tight control of the xerographic parameters. If the cyan dot is only slightly broken when it is developed on top of the yellow dot, a two-color moiré is likely to appear using conventional halftoning methods. However, use of the method and apparatus described herein, a slight imperfection of the cyan dot when placed over a yellow dot is much less likely to cause a visible artifact to appear. Thus, as a result of the present invention the latitude of xerographic or other marking processes can be significantly increased.

In recapitulation, the present invention is a method and apparatus that reduces two-color moiré often found during the rendering of full color images using halftoning techniques. The invention relies upon the application of a non-periodic halftone operation to the least perceptible color separation (e.g., yellow) so as to prevent the formation of periodic structures due to the interaction of the yellow colorant with one of the other colorants (e.g., cyan or magenta).

It is, therefore, apparent that there has been provided, in accordance with the present invention, a method and apparatus for the rendition of full color images without perceivable structuring within the image due to the interactions between two primary colors employed to render the image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for creating multiple color images using multiple marking colors, including:

an image-on-image printing system capable of rendering each of the multiple marking colors with n output density levels in superposed positions on a substrate to produce selected colors;

a source of image signals describing a multiple color document with a plurality of color separations, each image signal representing optical density with one of m levels, where m is greater than n;

a processor for preparing color documents for printing, said color documents each including a plurality of color separations, each color separation represented as a set of image signals describing optical density using m density levels;

a non-periodic halftone processor connected to said source of image signals, said non-periodic halftone processor reducing the number of levels m representing optical density in a first color separation to a number of levels $n_n$ representing optical density, wherein the first color separation is the least visually perceptible of the multiple marking colors, said halftone processor generating a non-periodic pattern thereby;

a periodic halftone processor connected to said source of image signals, said periodic halftone processor reducing the number of levels m representing optical density in at least one additional separation to a number of levels $n_p$ representing optical density, said periodic halftone processor generating a periodic pattern thereby; and means for directing signals processed at the non-periodic halftone processor and the periodic halftone processor to said printer to print said processed color image.

2. The apparatus of claim 1, wherein said first separation is a yellow separation.

3. The apparatus of claim 2, wherein said color separations further include cyan, magenta and black.

4. The apparatus of claim 1, wherein said first separation is a yellow separation imaged at a 90° angle of rotation and wherein the at least one additional color separation includes cyan and magenta color separations at 15° and 75° angles of rotation, respectively.

5. The apparatus of claim 3, wherein the colorant associated with said first separation is deposited by said printing system prior to the deposition of the at least one additional separation.

6. The apparatus of claim 1, wherein $n_n$ is at least equal to $n_p$.

7. The apparatus of claim 1, wherein $n_n$ is less than $n_p$.

8. A method for creating multiple color images on a printing system capable of rendering each of the multiple colors with n output density levels in superposed positions on a substrate to produce selected colors, including:

receiving, from a source of image signals, image signals describing a multiple color document with a plurality of color separations, each image signal representing an optical density of a particular color with one of m levels, where m is greater than n;

processing the image signals of a first, least-perceptible color separation with a non-periodic halftone processor connected to said source of image signals, to reduce the number of levels m representing optical density in the first, least-perceptible color separation to a number of levels $n_n$, representing the optical density, and generating a non-periodic output pattern thereby;

processing the image signals of at least one additional color separation with a periodic halftone processor connected to said source of image signals, to reduce the number of levels m representing optical density in the at least one additional separation to a number of levels $n_p$ representing the optical density, and generating periodic patterns for the at least one additional color separation thereby; and directing signals processed at the non-periodic halftone processor and the periodic halftone processor to said printer to print the processed color image.

9. The method of claim 8, wherein said first color separation is a yellow separation.

10. The method of claim 9, wherein said at least one additional color separation further includes color separations for cyan, magenta and black.

11. The method of claim 8, wherein said first separation is imaged at a 90° angle of rotation and wherein the at least two additional color separations are imaged at 15° and 75° angles of rotation.

12. The method of claim 10, wherein the colorant associated with said first separation is deposited by the printer prior to the deposition of the at least one additional separation.

13. The method of claim 8, wherein $n_n$ is at least equal to $n_p$.

14. The method of claim 8, wherein $n_n$ is less than $n_p$.

15. The method of claim 8, wherein the step of processing the image signals of a first color separation with a non-periodic halftone processor comprises applying a non-periodic image processing operation to the image signals, the image processing operation selected from a set of image processing operations including:

error diffusion;

stochastic screening; and pulse density modulation.

16. An image-on-image printing system for creating multiple color images using multiple marking colors, including:

an image input terminal acting as a source of digitized image signals, the digitized image signals describing a multiple color document with a plurality of color separations, each digitized image signal representing the optical density of a pixel for each of a plurality of colors;

an image processing unit for preparing the digitized image signals for printing as a color document wherein the color document is render using a plurality of color separations in superposed registration and where each color separation is represented as a set of image signals describing optical of the pixels, said image processing unit further including a non-periodic halftone processor, said non-periodic halftone processor reducing the number of levels representing optical density in a first color separation to $n_n$ levels wherein the first color separation is the least visually perceptible of the multiple marking colors, said halftone processor generating a non-periodic pattern thereby, and a periodic halftone processor, said periodic halftone processor reducing the number of levels representing optical density in two additional color separations to $n_p$ levels, said periodic halftone processor generating a periodic pattern thereby; and means for directing signals processed at the non-periodic halftone processor and the periodic halftone processor to said printer to print said processed color image.

17. The system of claim 16, wherein $n_n$ is at least equal to $n_p$.

18. The system of claim 16, wherein $n_n$ is less than $n_p$.

* * * * *